Figure 1:
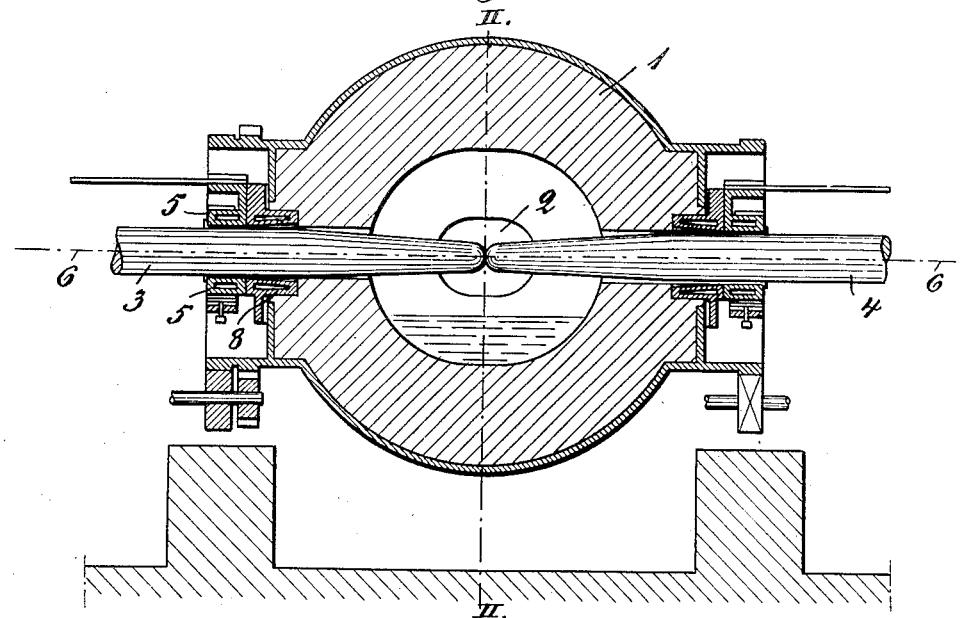
Figure 2:
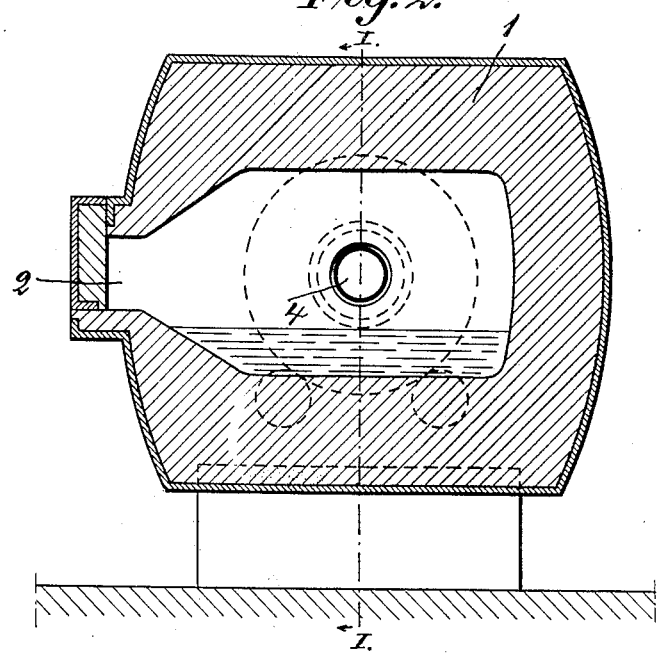
Figure 3:
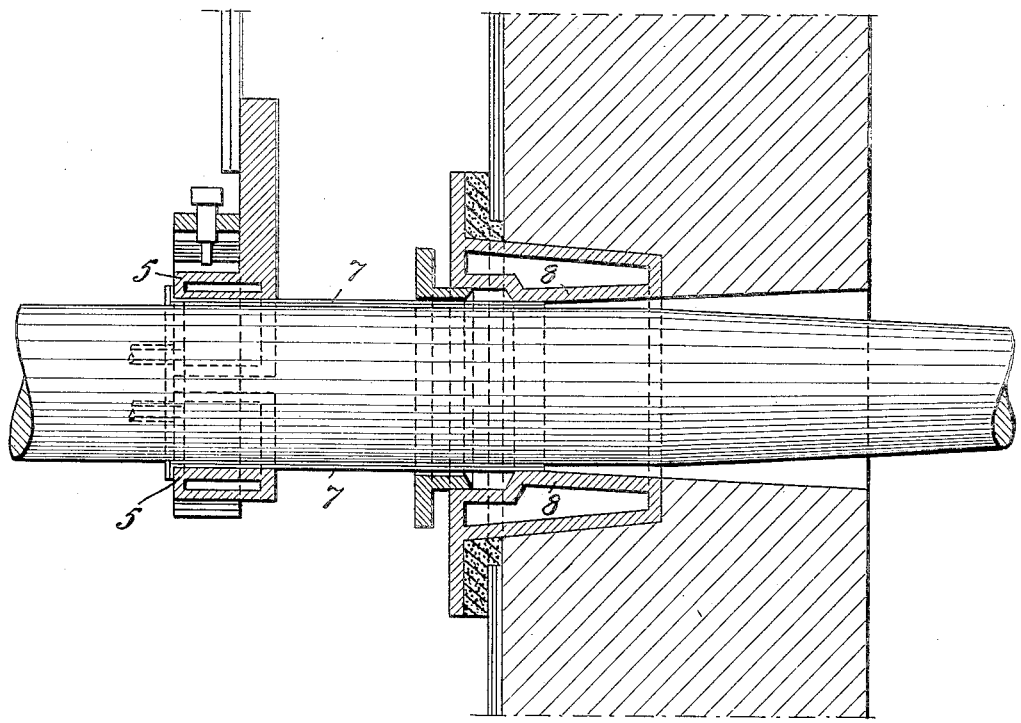

July 11, 1933.     A. H. PEHRSON     1,917,730
ELECTRIC FURNACE
Filed April 24, 1931     2 Sheets-Sheet 1.

Inventor
Adam Helmer
Pehrson
per
Attorney

Patented July 11, 1933

1,917,730

UNITED STATES PATENT OFFICE

ADAM HELMER PEHRSON, OF NORRNAS, OSCAR FREDRIKSBORG, SWEDEN

ELECTRIC FURNACE

Application filed April 24, 1931, Serial No. 532,412, and in Sweden October 30, 1928.

In metallurgical and chemical processes such as smelting, refining, reduction, manufacture of alloys etc., which are carried out in electric furnaces of the kind that are heated by means of radiation, the heat transference to the material under treatment is usually far from efficient. More particularly is this the case when the material is in a molten condition and covered with a layer of slag, through which the heat has to be transmitted to the underlying metal bath. Another difficulty is that the lower portions of the charge have a very much lower temperature than those situated at the surface. In order to obtain an even distribution of heat, the charge must be thoroughly stirred and mixed in such a way that a complete rearrangement of the different layers takes place, the colder bottom layers being stirred up to the surface and the hotter surface layers being forced down to the bottom etc. In refining and other processes in which the bath is treated with oxidizing or reducing slags, a thorough mixing motion as well of the slag as of the bath, is essential not only for the even distribution of the heat, but also for obtaining rapid and uniform chemical reactions.

These reactions, which mainly take place at the surface of contact between slag and metal bath, gradually slacken in intensity as the result of the formation on either side of the surface of contact between the slag and the metal bath of a layer or belt of refined metal in contact with a layer of spent or saturated slag. In order to ensure the completion of the reactions in all portions of the bath and to obtain a product of high and uniform quality, it is essential from time to time to bring about a thorough stirring motion both in the metal bath and in the slag, whereby fresh layers of unrefined metal from the lower portions of the bath are brought into contact with fresh unsaturated slag from the surface layers thereof.

The present invention refers to a method of treating materials for purposes of metallurgical and chemical processes of the kind mentioned above, and its object is to ensure the rapid completion of the reactions and to obtain a product of high and even quality by providing for a thorough mixing and a uniform distribution of heat throughout the entire charge.

The method consists therein, that the material under treatment, which constitutes the charge in an electric furnace of the kind that is heated by means of radiation, is subjected to successive alterations in form or shape, varying from a shape with a large surface exposed to radiation and a small depth to a shape with small surface exposed to radiation and a great depth.

These alterations in shape to which the charge at suitable intervals is subjected cause a stirring motion of such a nature that a complete rearrangement of the different layers in the charge will take place, the bottom layers being stirred up to the surface and the surface layers forced down to the bottom, resulting in an even distribution of heat throughout the charge, and, in case of processes involving the use of a slag, a continual, lively and active contact between unrefined metal and unsaturated, reactive slag. The slag will not be intermixed with the bath but will remain floating on the surface thereof.

The enclosed drawings show diagrammatically one kind of a furnace suitable for carrying out the method here referred to.

Fig. I and II show respectively a front and a side section through the furnace.

Fig. III shows the electrode guide and contact.

The furnace 1 is arranged so that it can be oscillated or tipped about an axis 6. The treatment chamber is bottle shaped and of elongated section in a plane being at right angles to the tipping axis. At one end, corresponding to the neck of the bottle, a hole or opening 2 is arranged for charging and tapping, the three remaining walls of the chamber, situated in planes parallel to the axis of tipping are built and lined in such a way that they form a continuous hearth. During the tipping of the furnace an angle of 180°, the said three walls serve in turn as furnace bottom.

The furnace is heated electrically by means of radiation from one (or if so desired several) pairs of electrodes 3, 4 which are introduced centrally and parallelly with the axis of tipping through opposite sides of the treatment chamber, in such a way that they in every working position of the furnace will be situated at a distance from the surface of the charge that is approximately constant. The electrodes are preferably maintained in short circuit, in order to form resistors, as the distance from the electrodes to the walls of the treatment chamber is too short to allow the use of electric arcs for heating purposes. In this case, the electrodes are held in constant contact by means of suitable arrangements for pressing the points together and are automatically conveyed into the treatment chamber according to the rate at which they are consumed.

The wear of short circuited electrodes is very slight and the consumption small, for which reason it is possible to conduct the current to them by means of stationary contacts clamped on the electrode and shifted from time to time as will be found necessary.

Such a contact is shown in Fig. III. A number of close fitting plates 7 are clamped on to the electrode by means of the contact sleeve 5, said plates being projected into the cooling tuyers 8 and fed into the latter together with the electrode. But the current can just as well and with quite as good a result be conducted to the electrodes by any other means, that has proved to be suitable, such as sliding contacts etc.

Said process—refining, smelting etc.—is started with the furnace occupying a horizontal position (Fig. II) so that the charge may rest on one of the long walls of the treatment chamber, thus having a great surface area and a small depth. After a suitable time the furnace is tilted into a vertical position, where the charge obtains a small surface area and a great depth, thus causing the mixing motion described above. After a further lapse of time, the furnace is tilted into the opposite horizontal position, in such a way that the bath rests on the opposite long wall of the treatment chamber. By this means the heat absorbed by the roof of the chamber is imparted to the charge when the furnace is tilted an angle of 180°.

The furnace is manipulated in this manner as often and as long as the nature of the process demands.

By means of the arrangement in furnace design and construction outlined above, the method, which is the subject of this invention, is effectively put into practice and the charge in the furnace may be continuously or intermittently subjected to the alterations in form referred to without any disturbance of the running of the furnace, whereby the difficulties usually connected with processes of this kind are overcome. The heat is more efficiently and more rapidly transferred to and employed in the charge, as well as more evenly distributed, so that an even and uniform temperature is maintained in all portions of the charge, in addition to which the chemical reactions take place evenly and the whole process is considerably simpler to run and control than by any other of the methods hitherto employed for these purposes.

As an example a refining process may be cited. The metal bath is treated with a suitable refining slag, which will be combined with and absorb the impurities of the metal. The tipping motion described above brings about a stirring motion in the metal bath as well as in the slag, whereby, at the surface of contact between bath and slag, the layers of already refined metal and neutral saturated slag are carried away and replaced by layers of unrefined metal from the bottom of the bath and fresh reactive slag from the surface of the slag. The refining process is thus smoothly and rapidly accomplished without stirring by means of metal rods or the like.

The method may be applied to oxidizing or reducing processes of all kinds, in which the bath is treated with oxygen compounds or some suitable reducing agent respectively. A low-carbon ferrochrome can for example be manufactured as follows.

The chrome ore is charged into the furnace together with a relatively small amount of carbon or some other reducing agent, such as silicon, preferably in briquette form. As the reduction proceeds, a metal bath will be formed covered by a layer of slag. Fresh carbon or other reducing agent (such as silicon) is charged on to this slag layer and during the oscillating and tipping of the furnace the said reducing agent is brought into contact with the metal oxides in the slag, whereby the metal is reduced. The layer or slag will prevent the reducing agent from coming into direct contact with the metal bath.

The process which is the subject of the invention may also to a great advantage be applied to the reduction of zinc and other volatile metals, for the reduction of which it is of utmost importance that all portions of the charge are being uniformly heated. In this case the treatment chamber is by some suitable means connected with a condensor for collecting and condensing the metal, and the condensor is preferably so disposed in relation to the furnace that it partakes in the oscillating or tipping motion thereof. Chrome may also be treated to advantage in a furnace of this kind provided with a condensor, as it has been found that this metal is volatile and to a certain extent goes off in gaseous form at ordinary smelting temperature. By this means the chrome may be separated from the iron in the ore.

Having now particulary described the nature of my invention and the manner of its operation, what I claim is:—

1. Electric radiation furnace for carrying out metallurgical and chemical processes including in combination, a treatment chamber having walls built and lined with a refractory material to form a continuous hearth, electrodes for heating the charge, means providing optionally for continuously or intermittently tilting or oscillating the furnace through an angle of 180° in order to interchange the roof and hearth and provide alterations in the shape of the charge, said treatment chamber being of elongated section disposed at right angles to the axis of tilt or oscillation.

2. Electric radiation furnace for carrying out metallurgical and chemical processes, including in combination, a treatment chamber having walls built and lined with a refractory material to form a continuous hearth, electrodes for heating the charge which are short-circuited to form electric resistors, and means providing optionally for continuously or intermittently tilting or oscillating the furnace through an angle of 180° in order to interchange the roof and the hearth and provide alterations in the shape of the charge, said treatment chamber being bottle-shaped and arranged to be tilted or oscillated about an axis disposed approximately at right angles to the central axis of said bottle-shaped chamber.

3. Electric radiation furnace for carrying out metallurgical and chemical processes, including in combination, a bottle-shaped treatment chamber having walls built and lined with a refractory material to form a continuous hearth, electrodes for heating the charge, and means providing optionally for continuously or intermittently tilting or oscillating the furnace through an angle of 180° in order to interchange the roof and hearth and provide alterations in the shape of the charge, said electrodes being disposed parallel to the axis of tilt or oscillation.

4. Electric radiation furnace for carrying out metallurgical and chemical processes, including in combination, a bottle-shaped treatment chamber having walls built and lined with a refractory material to form a continuous hearth, electrodes for heating the charge, means providing optionally for continuously or intermittently tilting or oscillating the furnace through an angle of 180° in order to interchange the positions of the roof and hearth and provide alterations in the shape of the charge, said electrodes being substantially alined with the axis of tilt or oscillation and so arranged that they are constantly spaced approximately the same distance from the surface of the charge during the tilting or oscillating operations.

ADAM HELMER PEHRSON.